United States Patent [19]

Venkatsubramanian et al.

[11] 4,376,023
[45] Mar. 8, 1983

[54] PROCESS FOR THE PREFERENTIAL SEPARATION OF DEXTROSE FROM OLIGOSACCHARIDES

[75] Inventors: Kalyanasundram Venkatsubramanian, New Brunswick, N.J.; Surendar M. Jain, Watertown; Anthony J. Giuffrida, North Andover, both of Mass.

[73] Assignee: The Hubinger Company, Keokuk, Iowa

[21] Appl. No.: 312,400

[22] Filed: Oct. 19, 1981

Related U.S. Application Data

[63] Continuation-in-part of Ser. No. 203,633, Nov. 3, 1980, Pat. No. 4,299,677.

[51] Int. Cl.$^3$ ............................................. B01D 13/02
[52] U.S. Cl. ................................. 204/180 P; 127/42; 127/53; 127/63; 127/46.3; 204/301
[58] Field of Search ........................ 204/180 P, 301; 127/46.3, 53, 42, 63

[56] References Cited

U.S. PATENT DOCUMENTS

| | | | |
|---|---|---|---|
| 3,290,173 | 12/1966 | Marino | 204/180 P |
| 3,383,245 | 5/1968 | Scallet | 204/180 P |
| 3,475,216 | 10/1969 | Walon | 204/180 P |
| 3,525,682 | 8/1970 | McCrae et al. | 204/180 P |
| 3,666,647 | 5/1972 | Kubo et al. | 204/180 P |
| 3,718,560 | 2/1973 | Sugiyama et al. | 204/180 P |
| 3,781,174 | 12/1973 | Nishijima et al. | 204/180 P |
| 3,799,806 | 3/1974 | Madsen | 204/180 P |
| 4,299,677 | 11/1981 | Venkatsubramanian | 204/180 P |

*Primary Examiner*—Arthur P. Demers

[57] ABSTRACT

This invention describes the process of separating dextrose preferentially from a mixture of dextrose and oligosaccharides by using ion exchange membranes. More particularly it relates to the process comprising the steps of (1) passing a liquid mixture of dextrose and oligosaccharides through a first feed chamber of an electro-osmosis cell comprising at least two chambers defined between ion exchange membranes having alternating high and low permeability coefficients with respect to each other, (2) passing a direct electric current transversely through said membranes and chambers in a direction to cause the dextrose to pass from said feed chamber through said high permeability coefficient membrane into a second chamber with said dextrose being substantially retained in the second chamber, and (3) recovering an oligosaccharide enriched and a dextrose enriched effluent from the separate chambers.

2 Claims, 1 Drawing Figure

PROCESS FOR THE PREFERENTIAL SEPARATION OF DEXTROSE FROM OLIGOSACCHARIDES

CROSS-REFERENCE TO RELATED APPLICATION

This application is a continuation-in-part of U.S. application Ser. No. 203,633, filed Nov. 3, 1980, now Pat. No. 4,299,677.

BACKGROUND OF THE INVENTION AND PRIOR ART

According to U.S. Pat. No. 3,440,159, the electrical separation of low molecular weight substantially un-ionized substances from liquid mixtures thereof with other substances is known. That patent relates to such separation of un-ionized or only partially ionized substances of low molecular weight (crystalloids) from high molecular weight substances (colloids) in aqueous solution by causing the former to migrate under the influence of an electric potential across ion selective membranes which are substantially impermeable to the high molecular weight substances (colloids). As examples of this process it is disclosed that such low molecular weight un-ionized substances as phenol, furfurol, xylose, arabinose, sucrose, lactose, fructose, mannose, maltose, and dextrose may be separated from such high molecular weight substances as albumin, casein, polysaccharides, lignin and dextrin, for example. Moreover, U.S. Pat. No. 3,718,560 discloses the removal of salts from sugar solutions by electrodialysis in a cell having ion permeable membranes alternately disposed between the electrodes. This same patent discloses that ionizing salts have also been removed from sugar solutions by means of cation and anion exchange resins. Furthermore, U.S. Pat. No. 3,806,363 discloses the following methods of separating glucose and fructose from mixtures containing such sugars: (1) converting fructose into a calcium-fructose complex by treatment with calcium hydroxide; (2) use of a calcium form cation-exchange resin bed; (3) use of a strontium form cation-exchange resin bed; (4) use of a silver form cationexchange resin bed; (5) use of a borate form anion-exchange resin bed; (6) use of a hydrazine form cation-exchange resin bed, and (7) a method involving the use of a bisulfite form anion-exchange resin bed. According to Pat. No. 3,806,363 only the method utilizing calcium hydroxide has been adopted for commercial operation, but it gives poor yield. Furthermore, the cation exchange resin processes are not very flexible and result in highly dilute process streams since water is used as the desorbent. This results in high evaporation cost.

BRIEF SUMMARY OF THE INVENTION

It has now been found that dextrose may be preferentially separated from a mixture of dextrose and oligosaccharides. This result is accomplished by a process comprising the steps of (1) passing a liquid mixture of dextrose and oligosaccharides through a first feed chamber of an electro-osmosis cell comprising at least two chambers defined between ion exchange membranes having alternating high and low permeability coefficients with respect to each other, (2) passing a direct electric current transversely through said membranes and chambers in a direction to cause the dextrose to pass from said feed chambers through said high permeability coefficient membrane into a second chamber with said dextrose being substantially retained in the second chamber, and (3) recovering a oligosaccharide enriched and a dextrose enriched effluent from the separate chambers. Preferably, the ion exchange membranes are in the form of a cation of an alkaline earth metal selected from the class consisting of calcium, magnesium and barium.

DETAILED DESCRIPTION OF THE INVENTION

Figure 1:
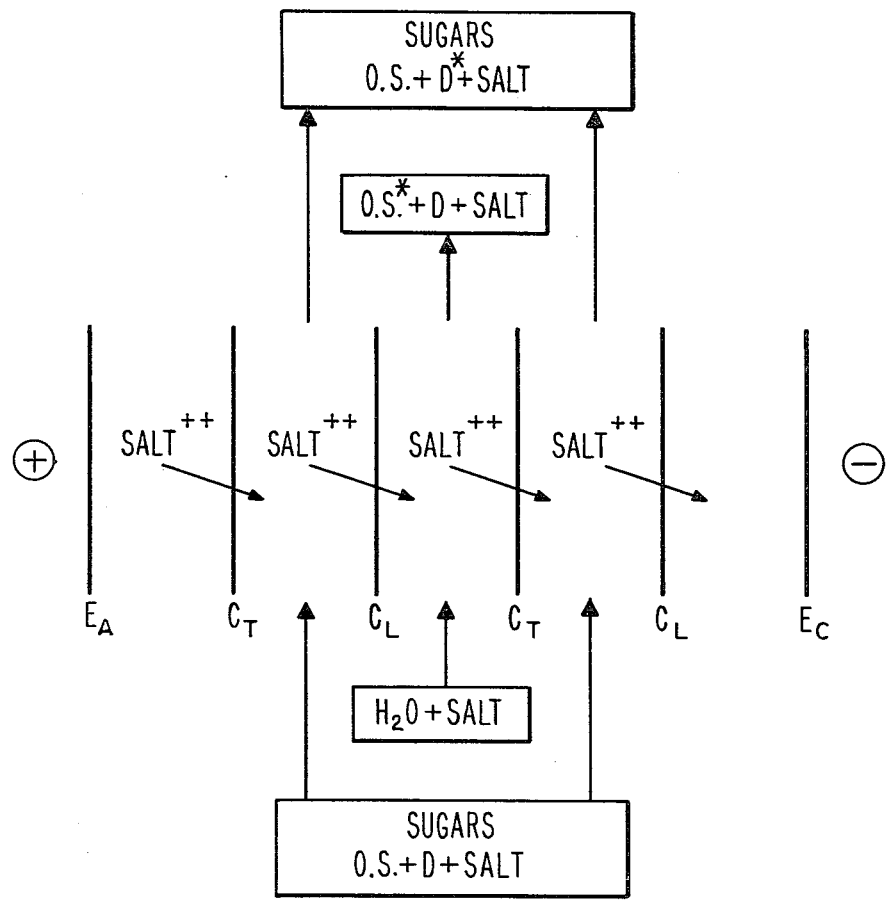

The process of this invention may be described by reference to FIG. 1 wherein:

$E_A$ = anode electrode
$C_L$ = relatively high permeability membrane
$C_T$ = relatively low permeability membrane
O.S. = oligosaccharides
D = dextrose
* = indication of enriched product
$E_C$ = cathode electrode FIG. 1 shows schematically a stack of electrodialysis membranes in a configuration designed for electroosmatic transfer. A complete discussion of electrodialysis membranes is contained in the publication entitled "Principles and Applications of Electrodialysis and Related Membrane Processes" by William B. Iaconelli, published by Ionics, Inc., Watertown, MA 02172 (July 1970). A direct current power supply is connected to the electrodes with the positive connected to the anode and negative to the cathode. A solution of oligosaccharides, dextrose and salt is shown being introduced between alternating high permeability and low permeability membranes. Also an aqueous salt solution is shown being introduced between alternating membranes. In accordance with the process of this invention the salt comprises a salt of an alkaline earth metal selected from the group consisting of calcium, magnesium and barium. This operating electrodialysis stack effectively produces the two effluents shown, that is an oligosaccharide enriched stream and a dextrose enriched stream.

The records of actual runs of the electrodialysis method in accordance with the process of this invention are summarized in Table 1 and 2 as follows:

TABLE 1

| | | | STREAM COMPOSITIONS (grams) | | | | | | | | |
|---|---|---|---|---|---|---|---|---|---|---|---|
| | | Salt | Feed | | | Retentate | | | Product | | |
| Run No. | Membranes | (CaCl$_2$) conc. | Dextrose | Maltose | Total | Dextrose | Maltose | Total | Dextrose | Maltose | Total |
| 20 | IONICS **61AZL&61CZl | 20 g/l | 345 | 5.3 | 350.3 | 151.7 | 0.9 | 152.6 | 173.6 | 1.6 | 175.2 |
| (Flux = 0.926 lb-prod/hr-ft$^2$, Power Cons. = 1.404 KWH/lb prod, *R = 0.6, g sugar per = 32) | | | | | | | | | | | |
| 21 | IONICS **61AZL&61CZL | 5 g/l | 344 | 5.5 | 349.5 | 237.6 | 4.1 | 241.7 | 95.8 | 0.08 | 96.6 |
| (Flux = 0.0851 lb-prod/hr-ft$^2$, Power Cons. = 0.865 KWH/lb prod, *R = .52, g sugar per = 41.4) | | | | | | | | | | | |
| | IONICS | 5 g/l | 329.4 | 6.0 | 335.4 | 173.7 | 3.3 | 177.0 | 137.7 | 2.0 | 139.7 |

TABLE 1-continued

| Run No. | Membranes | Salt (CaCl$_2$) conc. | STREAM COMPOSITIONS (grams) | | | | | | | | |
|---|---|---|---|---|---|---|---|---|---|---|---|
| | | | Feed | | | Retentate | | | Product | | |
| | | | Dextrose | Maltose | Total | Dextrose | Maltose | Total | Dextrose | Maltose | Total |
| 22 | **61MZL&61CZI | | | | | | | | | | |

(Flux = 0.1274 lb-prod/hr-ft$^2$, Power Cons. = 0.575 KWH/lb prod, *R = .8, g sugar per ℱ = 66.8)

*R (Screening Factor) = $\frac{\text{(oligosaccharides/dextrose) PRODUCT}}{\text{(oligosaccharides/dextrose) FEED}}$

**Cation Membranes

TABLE 2

Feed: 95% DE Corn Syrup
Membranes: IONICS 61 CZL (cation) & 103 QZL (anion)
Salt Concentration: 50 g/l CaCl$_2$

| STREAM COMPOSITIONS | | | |
|---|---|---|---|
| | Feed | Retentate | Product |
| Dextrose, g | 299 | 259 | 28 |
| Maltose, g | 19.1 | 13.8 | not detectable |
| Higher Sugars, g | 16.0 | 12.0 | " |
| Total, g | 334.8 | 284.8 | 28 |
| Flux | | 0.074 lb-prod/hr ft$^2$ | |
| Power Consumption | | 1.09 KWH/lb-prod. | |
| *R | | 0 | |
| g sugar per ℱ | | 29.3 | |

For the runs shown in Table 1, the feed stream consisted of synthetic mixture of dextrose and maltose with a total solids concentration of 32%. Typically, this yielded a DE level of 97%. In these runs maltose was used as a representative oligosaccharide.

For the run shown in Table II, the feed stream was a commercial preparation known as 95 DE corn syrup, having the indicated composition.

A ten-cell pair membrane stack with a diluting and a concentrating stream was employed. The membranes used were manufactured by Ionics, Inc., Watertown, Mass. The analytical results obtained are based on high pressure liquid chromatography. The solids content was monitored by a hand sugar refractometer and the specific gravity determined from tables for corn syrups. In each run, flow rates, stream volumes, pressures, voltage and current were monitored. A heat exchanger system was incorporated to maintain temperatures of the dilute and enriched streams.

It is apparent from the results shown in Tables I and II that oligosaccharide-dextrose separation may be achieved by electrodialysis in accordance with the process of this invention. Dextrose can be effectively separated from oligosaccharides, the extent of separation being a function of salt concentration and the particular membrane system employed.

Having thus described the invention, we claim:

1. The process of separating dextrose preferentially from a mixture of oligosaccharides and dextrose by electrodialysis comprising the steps of (1) passing a liquid mixture of dextrose and oligosaccharides through a first feed chamber of an electro-osmosis cell comprising at least two chambers defined between ion exchange membranes having alternating high and low permeability coefficients will respect to each other, (2) passing a direct electric current transversely through said membranes and chambers in a direction to cause the dextrose to pass from said feed chamber through said high permeability coefficient membrane into a second chamber of said cell with said dextrose being substantially retained in the second chamber, and (3) recovering a oligosaccharide enriched and a dextrose enriched effluent from the seperate chambers.

2. The process of claim 1 wherein said liquid mixture contains a mediating cation.

* * * * *

UNITED STATES PATENT OFFICE
CERTIFICATE OF CORRECTION

Patent No. 4,376,023  Dated March 8, 1983

Inventor(s) Kalyanasundram Venkatsubramanian, Surendar M. Jain and Anthony J. Giuffrida It is certified that error appears in the above-identified patent and that said Letters Patent are hereby corrected as shown below:

TABLE 1, line beginning "(Flux=0.926 lb-prod/hr-ft$^2$" after the word "per" insert --$ft$--.

TABLE 1, line beginning "(Flux=0.0851 lb-prod/hr-ft$^2$" after the word "per" insert --$ft$--.

TABLE 1, line beginning "(Flux=0.1274 lb-prod/hr-ft$^2$" after the word "per" insert --$ft$--.

Title page, the Assignee block should read --The Hubinger Company, Keokuk, Iowa and Ionics, Incorporated, Watertown, Massachusetts--.

Signed and Sealed this

Twenty-fifth Day of October 1983

[SEAL]

Attest:

Attesting Officer

GERALD J. MOSSINGHOFF

Commissioner of Patents and Trademarks